United States Patent [19]

Chirgwin

[11] 4,039,910
[45] Aug. 2, 1977

[54] DYNAMOELECTRIC MACHINE

[75] Inventor: Keith M. Chirgwin, Palos Verdes Estates, Calif.

[73] Assignee: The Garrett Corporation, Los Angeles, Calif.

[21] Appl. No.: 637,993

[22] Filed: Dec. 5, 1975

Related U.S. Application Data

[62] Division of Ser. No. 396,043, Sept. 10, 1973, Pat. No. 3,930,175.

[51] Int. Cl.² .......................................... H02M 5/32
[52] U.S. Cl. ................................... 318/213; 191/11; 363/9; 363/176
[58] Field of Search ............................... 180/65 R; 318/195; 197; 198; 199; 213; 233; 232 191/11; 321/62, 63, 321/64

[56] References Cited

U.S. PATENT DOCUMENTS

| 2,703,345 | 3/1955 | Pestarini | 191/11 |
| 3,378,756 | 4/1968 | Potter | 321/64 |

*Primary Examiner*—Herman T. Hohauser
*Attorney, Agent, or Firm*—Joel D. Talcott; Albert J. Miller

[57] ABSTRACT

A dynamolectric machine stator has a primary winding for single phase alternating current input and a secondary winding for polyphase alternating current to be supplied from output terminals. The secondary winding is connected such that at least two frequencies are provided at the terminals. The rotor has two windings thereon for excitation, one being excitable for one frequency output and the other rotor winding being excitable for another frequency output at the secondary terminals. Another secondary winding may be provided on the stator to obtain a desired output terminal voltage at one of the selected frequencies.

7 Claims, 3 Drawing Figures

DYNAMOELECTRIC MACHINE

This is a divisional application Ser. No. 396,043 filed Sept. 10, 1973 now U.S. Pat. No. 3,930,175, issued Dec. 30, 1975.

BACKGROUND OF THE INVENTION

The transmission and transfer of alternating current electrical power from the generating source to the end user requires particular consideration of many variables when the source is stationary and the user is in motion, as in the case of an electrical railway. One of the principal factors to be considered is that of money outlay, either as a first cost or for the rehabilitation and updating of existing trackage and railway cars or vehicles. With the usual number of vehicles per mile of track, the cost of electrification of the track is many times the cost of the electrical equipment on the vehicle, and it thus behooves the designer to point efforts to a vehicle system in which the cost of track electrification is minimized. It is recognized that highest possible voltage, single phase power with reasonably high power factor, results in lowest track costs.

Insofar as voltage is a factor, it is desirable for the wayside power distribution system to furnish alternating current power at 25,000 or even 50,000 volts in the case of station stop distances of the order of 50 miles, for example. With voltages of this level, it is no longer practical to furnish polyphase power through the pickup, and it becomes essential to utilize a third rail or overhead catenary system and pantograph pickup with current return in the grounded reaction rail to supply single phase power. Given this situation of power supply from the track electrification it is seen that the equipment on board the vehicle must be adapted to convert the high voltage single phase alternating current into power at the wheels and, at the same time, present a reasonable power factor window for the source to look into. It is apparent, of course, that such on board equipment ought not exact any undue penalty of weight and envelope.

The voltage aforesaid is too high for the traction motor or motors, so a transformer is needed aboard the vehicle. Furthermore, if the traction motors are of the induction type (either rotary or linear), polyphase power is required at least at starting. On the other hand, either rotary or linear induction motors present a poor power factor.

To meet this problem there was devised the Kando System used on the Hungarian State Railways for a period extending from 1932 to sometime during the 1950's. This system was featured by a free-running, rotating synchronous machine having a direct current excited rotor and a stator provided with single phase power input and polyphase power output windings. This converting machine provided step-down transformer action, phase conversion, and power factor correction in a single entity, whose weight was not of paramount importance since it was used on locomotives. For example, a typical Kando System, including the necessary auxiliary accessory equipment such as oil and water coolers and pumps, water tank, air circulating fans, and the like, occupied an envelope volume of about 4,500 cubic feet and weighed over 13 tons.

Modern high speed transportation methods, utilizing either rotary or linear types of polyphase induction motors, are not adapted to such unwieldy, cumbersome and massive converting machinery exemplified by the Kando System. Hence, later technology has tended to look in other directions for solutions to the problem of providing either tracked-wheel or tracked-air-cushion transportation vehicles or magnetic levitation vehicles adapted to speeds upwardly to 300 or 400 miles per hour.

SUMMARY OF THE INVENTION

The present invention is directed generally to means and methods of transformation of alternating current electrical energy from one characteristic form into another. There is provided dynamoelectric apparatus for converting alternating current from one voltage to another with phase conversion coupled with power factor correction where the load tends to reflect an undesirable lagging or leading power factor back to the supply.

Further provided is apparatus as aforesaid having dynamoelectric winding coils coupled together with connections coupled to a plurality of terminals, some of said connections establishing apparatus having one number of magnetic poles of said windings and other of said connections establishing apparatus having another number of poles of said windings.

The apparatus may employ two sets of windings, one of which establishes a certain number of poles for said apparatus and the other establishes a different number of poles, at least a portion of one of said windings being common to the other for the number of poles established thereby.

Specifically, the dynamoelectric apparatus may have a winding of a lesser number of poles, e.g., two poles or four poles, and a winding of a greater number of poles, e.g., six poles or ten poles, a portion of the six or ten pole winding being common to the respective two or four pole winding. The number of volts per Hertz of current may be substantially equal in both the windings.

DESCRIPTION OF THE PREFERRED EMBODIMENTS

Figure 1:
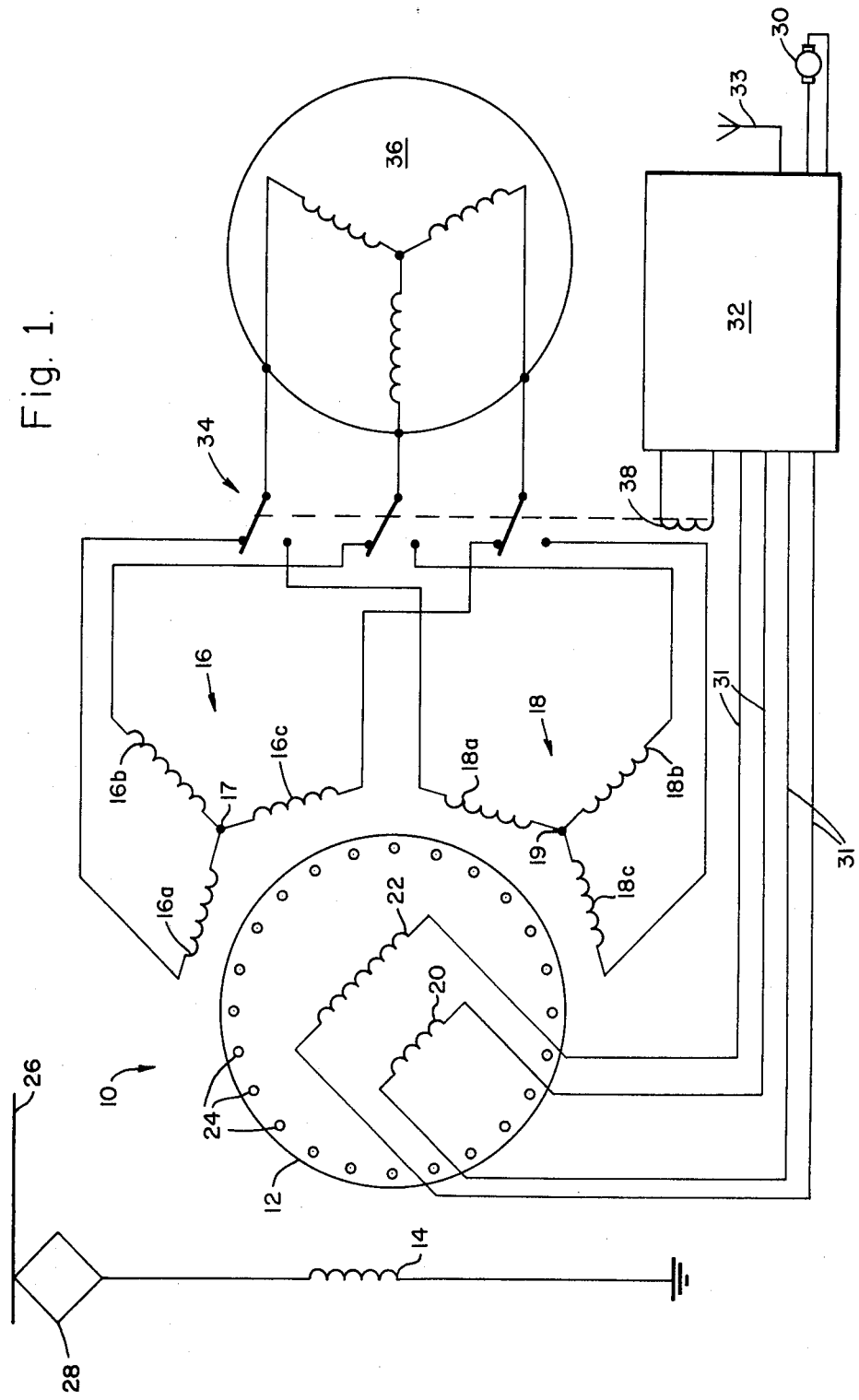
FIG. 1 is a diagrammatic illustration of one form of the invention, together with an example of a system in which it would find use.

Referring to FIG. 1 there is illustrated diagrammatically a dynamoelectric machine 10 functioning as a free-running synchronous converter, and having a rotor 12 adapted to rotate within a stator provided with a single phase primary winding 14 and a pair of polyphase secondary windings 16 and 18. Polyphase winding 16 is comprised of wye connected phase windings 16-A, 16-B and 16-C; polyphase winding 18 is comprised of wye connected phase windings 18-A, 18-B and 18-C. Windings 16-A, 16-B and 16-C have a common connection point 17; windings 18-A, 18-B and 18-C are common at point 19. The rotor 12 has excitation windings 20 and 22, and may also be provided with a damper or amortisseur winding 24 if required for initial starting of the machine 10.

Single phase alternating current is supplied to the high voltage side of the primary winding 14 from an overhead catenary system 26 through a pantograph 28, in the case of a system disposed on a railway transit car, in which case the low voltage side of the winding 14 is coupled to return ground track through the wheels of the car. Direct current excitation of the windings 20 and 22 is furnished by a generator 30 coupled to the windings via conductors 31 and a control apparatus 32 which is adapted by means of a manual control level 33 to variably control the current in the windings 20 and 22 as more particularly described hereinafter. As will be appreciated, the exciter generator 30 may be driven by the converter machine 10 if desired, as well known practice in the art.

As will be appreciated by those skilled in the art, the combination of the stator winding 14 with the rotor 10 and its excitation winding 20, for example, represents a known synchronous motor. This combination, together with a polyphase stator winding such as winding 16, is representative of a synchronous converter adapted to convert single phase current in the winding 14 at a high voltage, for example, into a lower voltage polyphase current in the winding 16. As is known, the winding 16 may supply an inductive load such as an induction motor having a relatively poor lagging power factor, with the machine 10 providing corrective action to present a high power factor window to the single phase supply.

If the excitation winding 20 is of the 4-pole type, coupled with a 4-pole connection of the primary winding 14, then the synchronous speed of the machine 10 will be 1800 rpm if the alternating current supply is 60 Hz. Likewise, the secondary output winding 16 will be 4-pole to provide 60 Hz polyphase current to the load. Within certain limits, the voltage at the output of winding 16 may be varied by regulating the current in the excitation winding 20.

The additional excitation winding 22 and secondary winding 18 provide a discrete step frequency change at the output of the winding 18. If, for example, it is desired to provide selective output frequencies of 60 Hz and 150 Hz, then the winding 16 will provide the 60 Hz current as described hereinabove. To obtain the 150 Hz frequency output, a 10-pole arrangement is indicated where the input frequency is 60 Hz. Thus the excitation winding 22, as well as the output winding 18, are both wound and connected as 10-pole arrangements. Furthermore, within reasonable limits the output voltage of the winding 18 may be varied by regulating the current in the excitation winding 22.

It will be apparent to those skilled in the art that excitation of the 4-pole winding 20 must be maintained at the required excitation level in order to maintain the synchronous speed of the machine 10 at 1800 rpm, otherwise the machine might get out of step. Thus, when the winding 22 is energized, the rotor 12 is excited with both 4 and 10-pole magnetization and the output of the 10-pole stator winding 18 is 300 Hz. It would be totally unexpected by those skilled in the art that both 4 and 10-pole excitation could be employed in one rotor with a 10-pole stator winding having an output frequency 2½ times that of the input frequency.

The output of the windings 16 and 18 is fed through a switching apparatus 34 to the load, schematically shown as an induction motor 36. Preferably, the switching apparatus is under the supervision of the control 32 by means of a relay coil 38, for example, which may be selectively energized to activate the switch means 34 for selective output of winding 16 or winding 18 to the load 36. It will be appreciated that the load 36 could be a rotary or linear induction motor. The invention herein is particularly efficacious in the case of a linear induction motor as utilized in a high speed transit railway car, since such a motor presents a very poor power factor to its supply because of the large air gap between the stator teeth and the reaction rail. The converter described provides the desired power factor correction.

The embodiment of the machine 10 of FIG. 1 effects a controlled transfer, in substantially the following fashion, of alternating current from the single-phase wayside or catenary system 26 to the load represented as a polyphase induction motor 36. The rotor 12 of machine 10 is first brought up to near synchronous speed from a standstill in known fashion. This may be accomplished by energizing the primary stator winding 14 and a phase-displaced starting winding (not shown) to provide a rotating field for reaction by the damper winding 24 on the rotor. Thus, if the primary winding 14 and the starting winding are connected as 4-pole windings, the synchronous speed will be 1800 rpm. It is obvious that the excitation winding 20 will also be a 4-pole arrangement. Therefore, when the rotor 12 has accelerated to near synchronous speed the winding 20 is energized to a basic excitation value and the starting winding disconnected, at which time the machine 10 acquires function in characteristic synchronous motor fashion. It will be apparent to those skilled in the art that the starting function thus described briefly may be accomplished automatically by the control 32 or manually by manipulation of the control lever 33, for example.

After the machine 10 is in step, the control lever 33 may be actuated to operate the switch apparatus 34 so as to couple the secondary generating winding 16 to the load and thereby energize the motor 36 with a 3-phase 60 Hz power having a relatively lower basic voltage value. Thereafter the lever 33 may be advanced to increase the excitation of winding 20 and thus increase the voltage output of winding 16 to the maximum design value. The increase of excitation with concurrent voltage increase of winding 16 results in acceleration of the load motor in stepless fashion from its start-up from standstill to its running speed under load.

Further advance of the lever 33 thereafter effects an energization of the 10-pole excitation winding 22 to its basic excitation value and a concurrent decrease of energization of the 4-pole excitation winding 20 to a value sufficient to maintain the machine 10 in step at its constant synchronous speed. This causes a nominal voltage at 150 Hz to be generated in the 10-pole secondary winding 18, and at this point in time the switch apparatus 34 effects a disconnect of the load motor 36 from the winding 16 and a connect with the winding 18. Thereafter the load motor 36 is accelerated by the increased applied frequency, followed by acceleration resulting from stepless increase of voltage effected by increasing excitation of winding 22 caused by further advance of the lever 33.

It will be understood, of course, that complex interacting effects may be experienced between the windings 14, 18, 20 and 22 during the 150 Hz power output to the load motor 36, hence varying energization of the excitation winding 20 may be desirable to maintain the machine in step.

Figure 2:
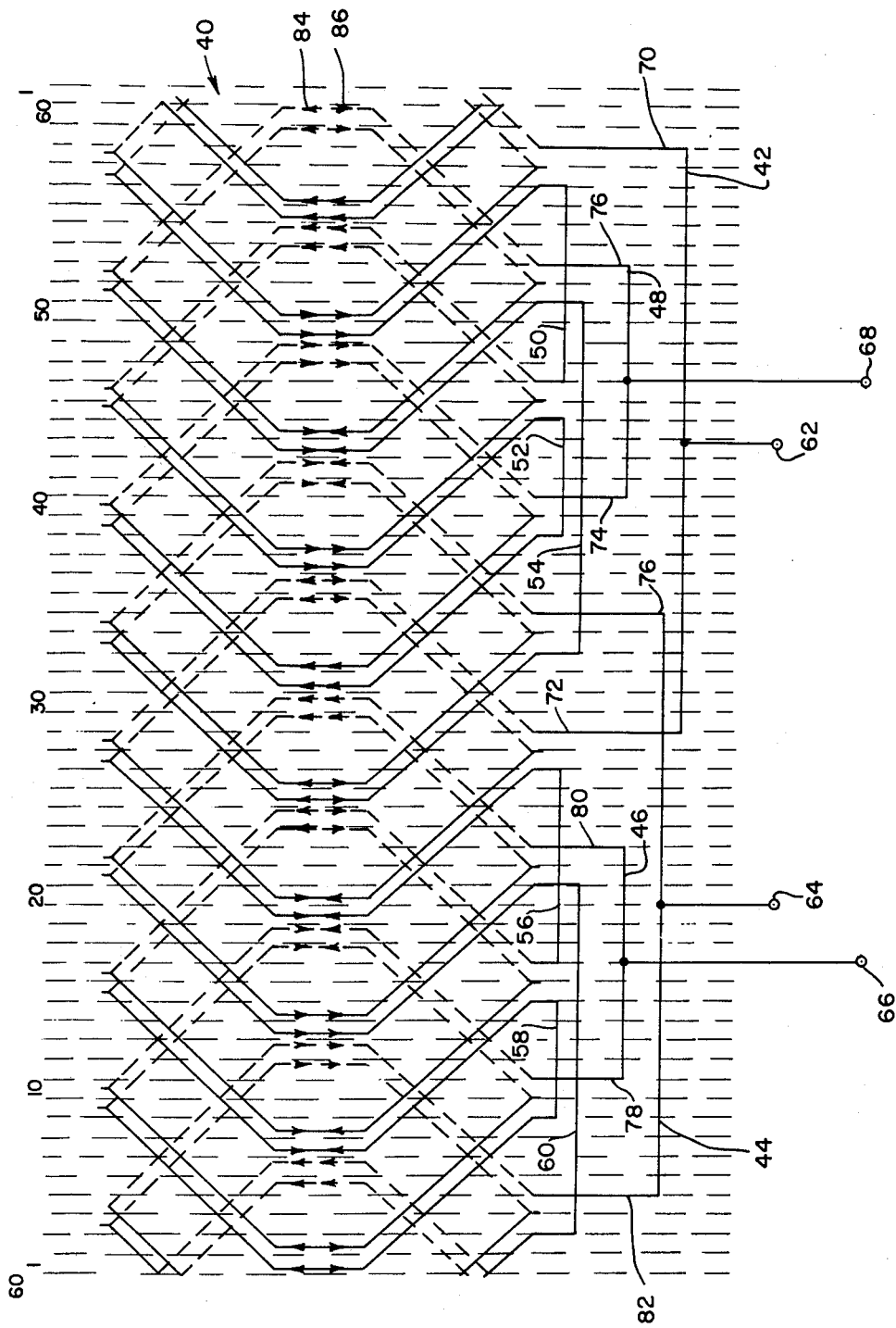
FIG. 2 is a winding layout and connection scheme for providing different numbers of magnetic poles in one form of the invention.

It was also conceived that portions, at least, of the two secondary generating windings could be combined with a subsequent saving of copper and winding labor. FIG. 2 is illustrative of such a combination effected in the case of a 60-slot stator, thus having 20 coils per phase (only one phase winding being shown, it being apparent that in such a case each of the other two phase windings would be identical but displaced 20 and 40 slots, respectively, from that shown). As thus shown the winding 40 for phase A, for example, as a coil span of slots 1-17 which thus provides a pitch of 2/3 on 10 poles and 14/15 on 4 poles.

The winding 40 closes on itself. That is, it constitutes a closed loop with no coil turn ends brought out for external connections. To this end there are four principal winding group connectors 42, 44, 46 and 48 and six supplementary winding group connectors 30, 52, 54, 56, 58 and 60. Connectors 42, 44, 46 and 48 are coupled to terminals 62, 64, 66 and 68, respectively for connection to the external circuit, as explained in detail hereinafter.

The coil grouping and winding arrangement, as coupled through the connectors 42 and 44 to the terminals 62 and 64, respectively, result in a 4-pole characteristic of the winding 40. The coil grouping and winding arrangement as coupled through the connectors 46 and 48 to the terminals 66 and 68, respectively, result in a 10-pole characteristic of the winding 40.

Assuming for purposes of explanation that current at a selected instant is entering terminal 62, the current is split in connector 42 with one portion going to the right into connector riser 70 and the other portion to the left into connector riser 72. The portion entering riser 70 progresses into the winding portion at the bottom of slot 6, crosses over the top into the upper winding portion in the slot 50, and successively into the respective bottom and top winding portions in slots 5 and 49 into the supplementary connector 50, thence successively slots 54, 38, 53, 37, connector 52, and slots 31, 47, 32 into descender 74, through connector 48 into riser 76 and successively slots 60, 44, 59, 43, connector 54, slots 25, 41, 26, 42, and descender 76 out the terminal 64 via connector 44.

The portion entering riser 72 passes successively through winding portions in slots 36, 20, 35, 19, connector 56, slots 24, 8, 23, 7, connector 58, slots 1, 17, 2, 18, descender 78, connector 46, riser 80, slots 30, 14, 29, 13, connector 60, slots 55, 11, 56, 12, and descender 82 out the terminal 64 via the connector 44.

In the 10-pole mode instantaneous current entering terminal 66 splits in connector 46 with one portion going to the left into riser (nee descender) 78 and the other portion to the right into the riser (nee descender) 80. The portion entering riser 78 traverses the windings in slots 18, 2, 17, 1, connector 58, slots 7, 23, 8, 24, connector 56, slots 19, 35, 20, 36 into descender (nee riser) 72, connector 42, riser 70, slots 6, 50, 5, 49, connector 50, slots 54, 38, 53, 37, connector 52, slots 31, 47, 32, 48, descender 74 and out terminal 68 via connector 48.

The portion entering riser 80 traverses the windings in slots 30, 14, 29, 13, connector 60, slots 55, 11, 56, 12, descender 82, connector 44, riser (nee descender) 76, slots 42, 26, 41, 25, connector 54, slots 43, 59, 44, 60, descender 76 and out the terminal 68 via connector 48.

The direction of the instantaneous current flow as assumed above in each of the 4-pole and 10-pole configurations is depicted on FIG. 2 by arrows on the winding portions in the slots. The upper horizontal row 84 of arrows is for the 4-pole configuration and the lower horizontal row 86 of arrows is for the 10-pole configuration. From this it will be seen in slots 1, 2, 7, and 8, for example, that the current flow is in opposite directions as between the 4-pole and 10-pole configuration, whereas in slots 37, 38, 49 and 50, for example, the current flow direction is the same for each configuration.

It is apparent, of course, that the voltage output of the winding shown in FIG. 2 will be different as between the terminals 62 and 64 when coupled to the output as four poles and the terminals 44 and 46 when coupled to the output as 10 poles. Thus for the same flux density, the voltage output on four poles in a particular embodiment mentioned it was desired to provide the load with constant volts per Hertz since the load was a linear induction motor. In other words, 250 volts per phase was the design objective for the 10-pole configuration having an output of 150 Hz, as against the desired 100 volts per phase in the 60 Hz 4-pole configuration.

Figure 3:
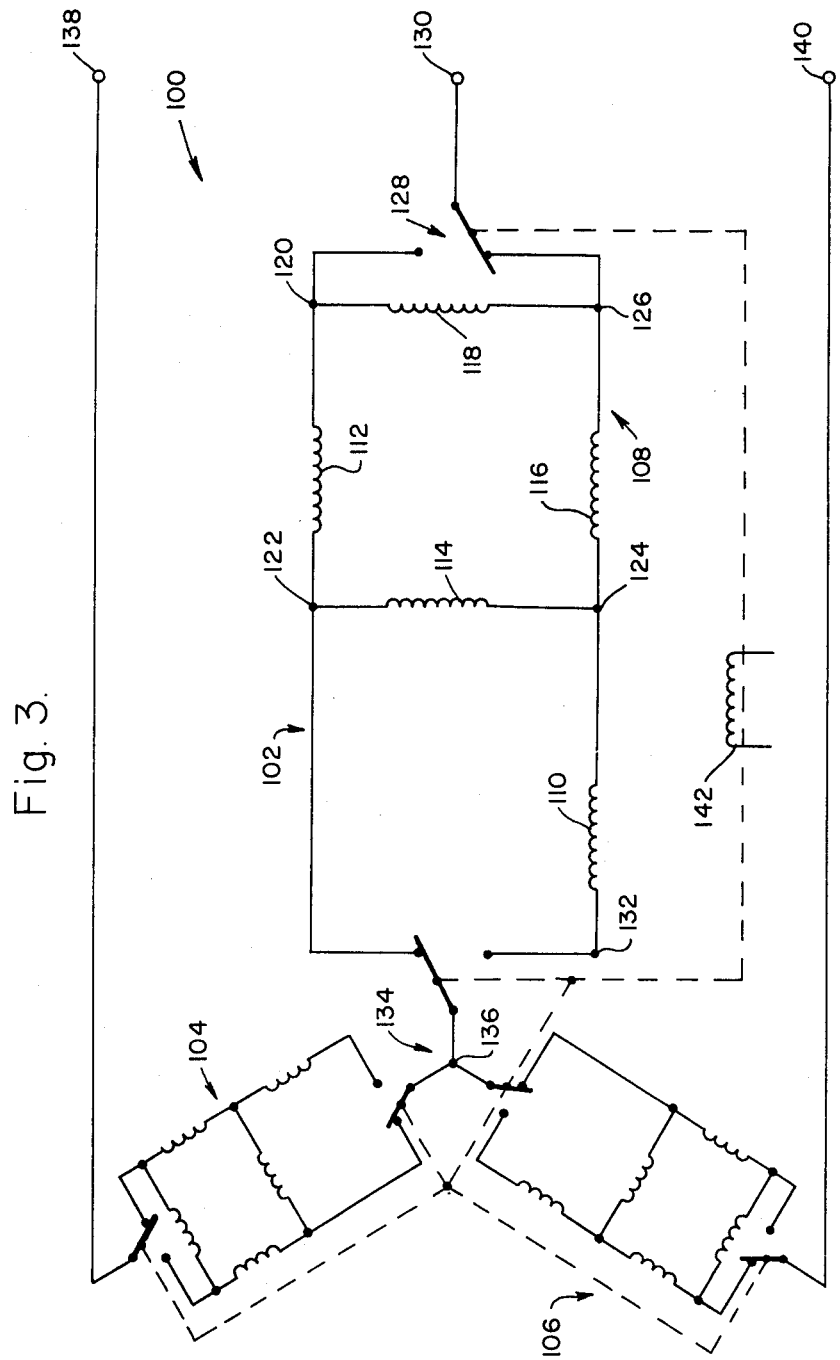
FIG. 3 is a schematic diagram of one phase of a secondary winding incorporating the winding of FIG. 2.

To this end a regular 10-pole winding was placed in the slots which were made deeper as necessary to accommodate this additional winding. The final winding connection was as shown in FIG. 3 in which the winding for one phase is illustrated in detail.

Referring to this figure, the three-phase winding 100 is illustrated schematically as comprising phase winding complexes 102, 104 and 106 constituting the winding arrangements for phases A, B and C, for example. Since all three phases are identical only phase A, for example, as exemplified by complex 102, need be explained in detail.

To this end the illustration for complexes 104 and 106 are of reduced proportions to permit the expanded illustration of complex 102 for clarity and ease of description. Winding complex 102 comprises a closed winding 108, which may correspond to the winding 40 of FIG. 2, and a winding 110 which may be considered as a regular winding, adopted to provide the additional generated voltage as referred to hereinabove. Assuming approximately the same flux densities, the half of the FIG. 2 slots remote from the air gap would be filled with the regular winding 110 while the remaining half of the slots would be filled with the closed winding 108. Closed winding 108 comprises winding coils 112, 114, 116 and 118 coupled together, as shown, to terminal points 120, 122, 124 and 126. Terminal point 124 is common to one end of each of windings 110, 114 and 116. Terminals 120 and 126 are coupled to switch 128 for selective connection to the output terminal 130 of phase A from the complex 102. A terminal 132 at the distal end of the winding 110 and the terminal 122 are coupled to switch 134 for selective connection to the terminal point 136 which is common to the coupling of winding complexes 102, 104 and 106 in wye-connection fashion. Winding complexes 104 and 106 have similar switching arrangements as shown, but not described in detail, for selective coupling to the common wye terminal 136 and to the respective output terminal points 138 and 140 for phases B and C.

The switches 128 and 134 for winding complex 102, as well as the switches for the winding complexes 104 and 106, are arranged for actuation by the field coil 142. The switches 128 and 134 may have a normal switching mode, when the coil 142 is not energized, to couple the phase A terminal 130 to the winding terminal point 126 and the common wye terminal 136 to the winding terminal point 122, as shown in FIG. 3.

Assuming instant current flow direction to be from the phase A terminal point 130 towards the common terminal point 136, it is seen that the current splits at terminal 126 to enter windings 116 and 118. The current portion in winding 116 traverses terminal point 124 into winding 114 and thence to terminal point 122. The current portion winding 118 traverses terminal point 120 into winding 112 and thence to join the other portion at terminal point 122, whereafter it traverses the switch 134 to the common terminal point 136.

When the field coil 142 is energized, the switches 128 and 134 operate to couple the phase A terminal point 130 to the winding terminal point 120 and the common wye terminal point to the winding terminal point 132. Thus with instant current flow as aforesaid, from the phase A terminal point 130 towards the common terminal point 136, the current splits at terminal 120 to enter windings 112 and 118. The portion of current in winding 112 flows from terminal 122 and through winding 114 to terminal 124. The current portion in winding 118 traverses terminal 126 and through winding 116 to join the other portion at terminal 124 whereafter the total current flows through the winding 110 and traverses terminal 132 and switch 134 to the common terminal point 136. It will be observed that current flow in either switching mode flows in the same direction in windings 112 and 116 but in opposite directions in windings 114 and 118. The similarity of the closed winding 108 of FIG. 3 to the winding 40 of FIG. 2 is now obvious. Thus, the terminal points 122 and 126 of FIG. 3 are the counterpart of the respective terminal points 62 and 64 of FIG. 2, whilst the terminal points 120 and 124 are the counterpart of the respective terminal points 66 and 68 of FIG. 2.

That is to say, with a winding configuration such as that of FIG. 2, current flow into terminal 126, to split with portions going through windings 116, 118 and 114, 112 to terminal 122, provides a 4-pole dynamoelectric structure. Similarly, current flow into terminal 120, to split with portions traversing windings 112, 118 and 114, 116 to terminal 124, provides a 10-pole machine which has a regular winding 110 to provide the desirably additional voltage for the 150 Hertz configuration.

What I claim is:

1. A drive system for an electric vehicle comprising:
   means for supplying high voltage, alternating current to said vehicle from a stationary source;
   a dynamoelectric machine on said vehicle including a primary stator winding defining a plurality of primary stator poles connected to receive said high voltage, alternating current, and including a multiphase secondary winding;
   a rotor on said machine including exciting winding means defining each of a first plurality of rotor poles and a second plurality of rotor poles greater in number than said first plurality of rotor poles;
   a multiphase vehicle drive motor responsive to multiphase alternating current input power for driving the vehicle at speeds directly related to the magnitude and the frequencey of said electrical input power;
   means for supplying exciting current to said exciting winding means to selectively excite said first and second plurality of rotor poles, said rotor being operated in response to the excitation of said plurality of rotor poles at a synchronous speed related to the frequency of said high voltage alternating current and to the number of said plurality of primary stator poles, said multiphase secondary winding being magnetically coupled to said exciting winding means and supplying said drive motor with multiphase alternating current input power at a first frequency in response to the excitation of said first plurality of rotor poles to thereby accelerate said drive motor toward a first speed, said multiphase secondary winding supplying said drive motor with multiphase alternating current input power at a second frequency higher than said first frequency in response to the excitation of said second plurality of rotor poles to thereby accelerate said drive motor toward a second speed higher than said first speed.

2. The drive system of claim 1 wherein said multiphase secondary winding includes a first output winding connected to a first pair of output terminals, said first winding having a first magnetic pole characteristic and said second winding having a second magnetic pole characteristic different from said first magnetic pole characteristic, said system further including switching means for connecting said drive motor to said first pair of output terminals in response to the excitation of said first plurality of rotor poles and for connecting said drive motor to said second pair of output terminals in response to the excitation of said second plurality of rotor poles.

3. The drive system of claim 2 wherein said first magnetic pole characteristic is that of a 4-pole set and wherein said second magnetic pole characteristic is that of a 10-pole set.

4. The drive system of claim 2 wherein said first magnetic pole characteristic is that of a 2-pole set and wherein said second magnetic pole characteristic is that of a 6-pole set.

5. The drive system of claim 1 wherein said high voltage, alternating current is at least 25,000 volts at about 60Hz.

6. A method for accelerating an electrically driven vehicle comprising the steps of:
   supplying high voltage, alternating current from a stationary source to a stator winding of a dynamoelectric machine;
   supplying exciting current to a multi-pole first rotor winding of the machine to operate the machine at a synchronous speed and to produce multiphase alternating current intput power at a first frequency from a multiphase secondary stator winding in magnetic coupling relation to the first rotor winding of the machine;
   supplying the multiphase alternating input power at the first frequency to a drive motor of the vehicle to accelerate the vehicle toward a first speed related to the first frequency;
   supplying exciting current to a multi-pole second rotor winding of the machine having a greater number of poles than the first rotor winding while continuing to operate the machine at the synchronous speed to produce multiphase alternating current input power at a second frequency higher than the first frequency from a multiphase secondary stator winding in magnetic coupling relation to the second rotor winding; and,
   supplying the multiphase alternating current input power at the second frequency to the drive motor of the vehicle to accelerate the vehicle toward a second speed higher than the first speed and related to the second frequency.

7. The method of claim 6 including the step of controlling the magnitude of the exciting current supplied to the multi-pole first and second rotor windings to control the magnitude of the multiphase alternating current input power from the multiphase secondary stator winding to thereby further control the acceleration of the vehicle.

* * * * *